United States Patent [19]
Goldberg et al.

[11] Patent Number: 5,036,511
[45] Date of Patent: * Jul. 30, 1991

[54] RECORDING METHOD AND APPARATUS

[75] Inventors: Paul R. Goldberg, Palo Alto; Bryan K. Clark, Sunnyvale; Joel D. Finegan, Campbell; Robert Guerra, Santa Clara, all of Calif.

[73] Assignee: Tandy Corporation, Ft. Worth, Tex.

[*] Notice: The portion of the term of this patent subsequent to Jul. 25, 2006 has been disclaimed.

[21] Appl. No.: 510,360

[22] Filed: Apr. 16, 1990

Related U.S. Application Data

[60] Division of Ser. No. 294,723, Jan. 10, 1989, which is a continuation-in-part of Ser. No. 153,288, Feb. 5, 1988, abandoned.

[51] Int. Cl.$^5$ .................. G11B 11/03; G11B 7/26
[52] U.S. Cl. .................. 369/284; 369/100; 369/280
[58] Field of Search ............... 369/100, 280, 283, 284, 369/286, 288, 275.2, 275.4

[56] References Cited

U.S. PATENT DOCUMENTS

| 4,398,203 | 8/1983 | Cornet . |
| 4,527,173 | 7/1985 | Gupta et al. . |
| 4,578,788 | 3/1986 | Ahn et al. . |
| 4,645,712 | 2/1987 | Ishigaki et al. . |
| 4,651,172 | 3/1987 | Watanabe et al. . |
| 4,673,626 | 6/1987 | Takeda et al. . |
| 4,680,458 | 7/1987 | Drexler . |
| 4,709,363 | 11/1987 | Dirks et al. . |
| 4,710,452 | 12/1987 | Raychaudhuri . |
| 4,719,615 | 1/1988 | Feyrer .................. 369/284 |
| 4,773,059 | 9/1988 | Minemura et al. . |
| 4,780,867 | 10/1988 | Lind .................. 369/284 |
| 4,798,785 | 1/1989 | Pan et al. . |
| 4,825,430 | 4/1989 | Halter et al. . |
| 4,852,075 | 7/1989 | Feyrer et al. . |
| 4,852,077 | 7/1989 | Clark et al. . |
| 4,879,709 | 11/1989 | Clark . |
| 4,896,314 | 1/1990 | Skiens et al. . |

FOREIGN PATENT DOCUMENTS

| 1229410 | 11/1987 | Canada . |
| 0263641 | 4/1988 | European Pat. Off. . |
| 0338776 | 10/1989 | European Pat. Off. . |

OTHER PUBLICATIONS

Watkinson, *The Art of Digital* Audio, Chapter 13, pp. 440–486, Focal Press, 1988.

Primary Examiner—Stuart S. Levy
Assistant Examiner—John Pokotylo
Attorney, Agent, or Firm—Townsend and Townsend

[57] ABSTRACT

An optical storage medium is disclosed. In general, the storage medium includes a substrate, with a first, expansion layer, a second, reflective layer bonded to the first layer, and a third, retention layer bonded to the second layer, opposite the first layer. An opto-electronic system for recording data is also disclosed, along with a method of manufacture of the storage medium.

28 Claims, 6 Drawing Sheets

RECORDING METHOD AND APPARATUS

CROSS REFERENCE TO RELATED APPARATUS

This is a division of application Ser. No. 294,723 filed Jan. 10, 1989, which is a continuation-in-part of application patent Ser. No. 153,288 now abandoned which is incorporated herein by reference. This application is related to U.S. Pat. Nos. 4,918,682, 4,879,709 4,852,077 and 4,970,711.

BACKGROUND OF THE INVENTION

1. Field of the Invention

This invention relates in general to the field of recording media. In particular, one embodiment of this invention provides an erasable optical storage media and write/read/erase mechanism therefor in which data may be recorded and erased in response to thermal effects and, in particular in response to light.

2. Description of Related Art

Optical data storage media in the form of compact disks are well known as an alternative to longplaying records and magnetic tape cassettes. The disks with which consumers are familiar are optical read-only disks and the common disk player is designed specifically for this type of disk. These disks have a reflective surface containing pits which represent data in binary form. A description of these pits and how they function is provided by Watkinson, "The Art of Digital Audio," Focal Press, Chapter 13.

Compact disks are currently produced by a pressing process similar to the process used to produce conventional long playing records. The process, referred to herein as the "mastering" process, starts by first polishing a plain glass optical disk. This disk has an outside diameter from 200 to 240 mm, a thickness of 6 mm and undergoes various cleaning and washing steps. The disk is then coated with a thin chrome film or coupling agent, a step taken to produce adhesion between the glass disk and a layer of photo-resist, which is a photo-sensitive material. Data on a compact disk master tape are then transferred to the glass disk by a laser beam cutting method.

The glass disk is still completely flat after it is written on by the laser beam because pits are not formed until the glass is photographically developed. The disk surface is first made electrically conductive and then subjected to a nickel evaporation process. The disk, now known as the glass master, then undergoes nickel electrocasting, a process which is similar to that used in called analog phono records. A series of metal replications follow, resulting in a disk called a stamper. The stamper is equivalent to a photographic negative in the sense that it is a reverse of the final compact disk; that is, there are now bumps were there should be pits. This stamper is then used to make a pressing on a transparent polymer such as polyvinyl chloride, poly(ethyl-metacrylate) and polycarbonate. The stamped surface is then plated with a reflective film such as aluminum or other metal and finally a plastic coating is applied over the film to form a rigid structure.

The player operates by focusing a laser beam on the reflective metal through the substrate and then detecting reflected light. The optical properties of the substrate, such as its thickness and index of refraction, are thus critical to the player's detection systems and standard players are designed specifically with these parameters in mind.

The pits increase the optical path of the laser beam by an amount equivalent to a half wavelength, thereby producing destructive interference when combined with other (non-shifted) reflected beams. The presence of data thus takes the form of a drop in intensity of the reflected light. The detection system on a standard player is thus designed to require greater than 70% reflection when no destructive interference occurs and a modulation amplitude greater than 30% when data is present. These intensity limits, combined with the focusing parameters, set the criteria for the compact disks and other optical data storage media which can be read or played on such players.

Media on which data can be recorded directly on and read directly from have a different configuration and operate under a somewhat different principle. One example is described in U.S. Pat. No. 4,719,615 (Feyrer et. al.).

The medium disclosed in Feyrer et. al, includes a lower expansion layer of a rubbery material which expands when heated. The expansion layer is coupled to an upper retention layer which is glassy at ambient temperature and becomes rubbery when heated. Both layers are supported on a rigid substrate. The expansion and retention layers each contain dyes for absorption of light at different wavelengths. Data are recorded by heating the expansion layer by absorption of light from a laser beam at a "record" wavelength to cause the expansion layer to expand away from the substrate and form a protrusion or "bump" extending into the retention layer. While this is occurring, the retention layer rises in temperature above its glass transition temperature so that it can deform to accommodate the bump. The beam is then turned off and the retention layer cools quickly to its glassy state before the bump levels out, thereby fixing the bump. Reading or playback of the data is then achieved by a low intensity "read" beam which is focused on the partially reflecting interface between the retention layer and air. When the read beam encounters the bump, some of the reflected light is scattered, while other portions of the reflected light destructively interfere with reflected light from non-bump areas. The resulting drop in intensity is registered by the detector. Removal of the bump to erase the data is achieved by a second laser beam at an "erase" wavelength which is absorbed by the retention layer and not the expansion layer. This beam heats the retention layer alone to a rubbery state where its viscoelastic forces and those of the expansion layer return it to its original flat configuration. The write, read and erase beams all enter the medium on the retention layer side, passing through retention layer before reaching the expansion layer.

The erasable optical storage medium system described in Feyrer et. al., has a number of disadvantages. For example, the writing and erasure of data must be performed at two different wavelengths of light.

Further, the device relies on reflection at the interface between the retention layer and air which results in an inherently low reflectivity (30% maximum). Thus the system cannot be read by the detection mechanism of a standard compact disk player designed for focusing through a 1.2 mm polycarbonate substrate and requiring 70% reflectance. Still further there is either a predetermined level of thermal conductivity between the heated expansion layer, to sufficiently raise the temperature of the retention layer so that it can accommodate the bump formed by the expansion layer, or the retention layer must absorb a predetermined amount of light energy at the "record" wavelength, in order to produce the needed temperature rise in the retention layer during recording. In either case this requirement must be met and accurately controlled if this media is to be produced with consistent recording characteristics. In addition, in order for the most effective erasure to be achieved, the retention layer must be heated separately from the expansion layer. This follows from the fact that during erasure the retention layer must reach a rubbery state in order for the viscoelastic forces of a cool expansion layer to pull the expansion layer back to its original flat configuration. If the expansion layer is heated during this time, it will not be in its relaxed state and it will therefore not return to its flat configuration. Since the expansion layer and the retention layers are in intimate physical contact, heat energy must be conducted between the two layers during both the recordation and erase processes, thus negating the possibility of only heating the retention layer. Any attempt to erase the medium during the act of recordation, i.e., direct overwrite data update, would therefore prove unsuccessful.

SUMMARY OF THE INVENTION

A method and apparatus for recording and erasing information on a storage medium is disclosed. The erasable optical storage medium of the present invention generally includes a rigid substrate and three overlying regions or layers including a first material, a second reflective material and a third material overlaying the second reflective layer, the third material optionally covered with a layer of protective material. This triple layer formation is susceptible to expansion and relaxation, to writing data thermally, to erasing data thermally and to reading data optically. Within this formation the first layer is optically coupled directly to the substrate as well as physically bonded to the second reflected layer. The second reflective layer is both optically coupled and physically bonded to the first and third layers. The third layer is optically coupled and physically bonded to the second reflective layer and optionally protected from physical damage by a protective fourth layer overlaying the surface opposite the reflective layer-third layer bond. A method and apparatus for recording and erasing on the medium is also disclosed.

DETAILED DESCRIPTION OF THE INVENTION

Figure 1:
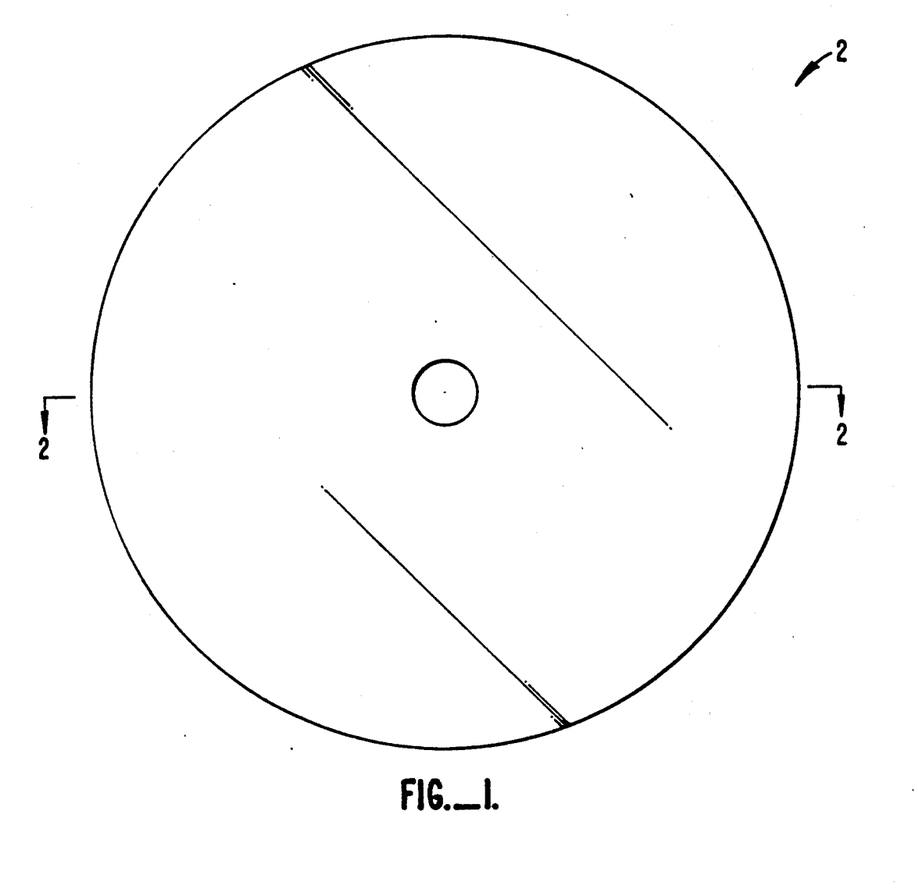
FIG. 1 is a plan view of a disk in accordance with the present invention.
Figure 2:
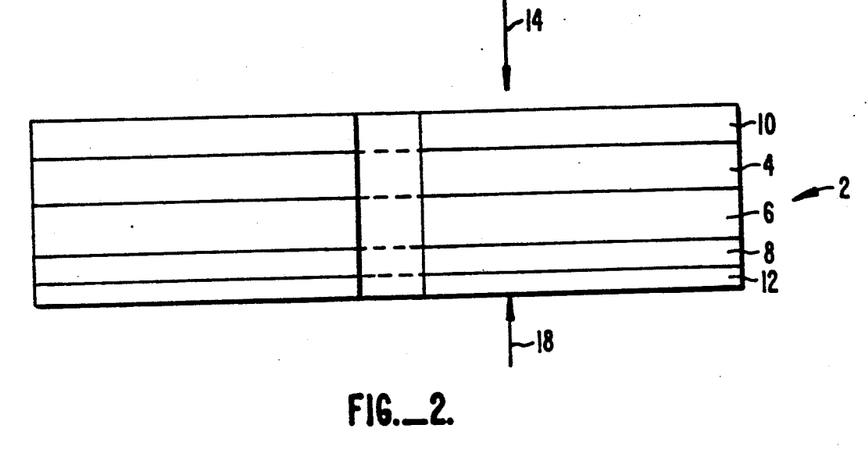
FIG. 2 is a cross-sectional view of the disk of FIG. 1.
Figure 3:
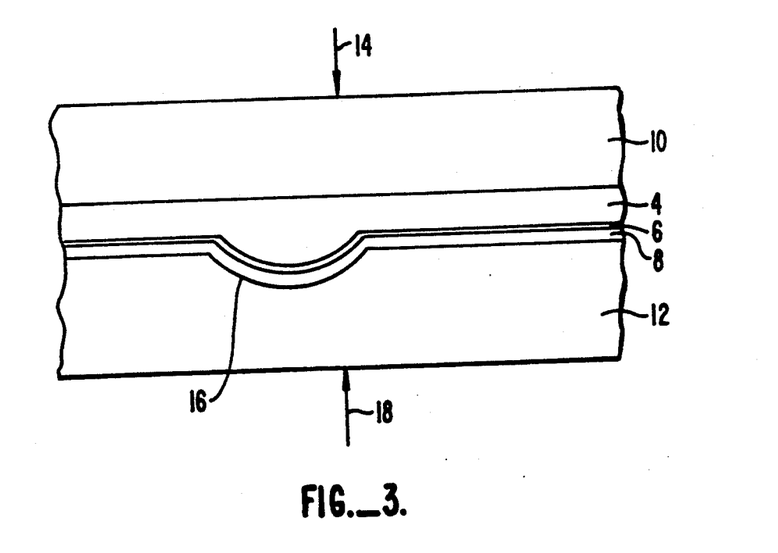
FIG. 3 shows a magnified portion of the disk of FIG. 2 with data recorded thereon.

FIGS. 1 and 2 generally illustrate the invention described herein as it is applied to a disk 2 which is used to record data in analog or digital form. The disk 2 includes a first layer 4, a second layer 6, and third layer 8. A substrate 10 and a protective layer 12 may also be provided. FIG. 3 illustrates the invention as shown in FIG. 2 in greater detail with a recorded "bump".

The first layer 4 is referred to elsewhere herein as the expansion layer and is formed of a material that (a) absorbs a percentage of light energy passing through it; (b) displays a high coefficient of thermal expansion, particularly when compared to the other layers of the medium, and; (c) displays a high coefficient of elasticity to the extent that it will expand readily when heated at the temperatures encountered during a recordation process without exceeding its upper expansive limit and contract to its original flat condition upon cooling.

The second layer 6 is referred to elsewhere herein as the central reflective layer. It is formed of a material that (a) is an alloy, elemental metal, or other reflective material which is soft, malleable, and deformable during the course of the recordation or erasure process, and; (b) reflects sufficient light energy such that the total light energy loss sustained by a monochromatic beam of light or other radiation (which is incident upon the substrate 10, and travels through the substrate, then through the first material layer 4, reflects off of the second layer 6, traverses again through the first material layer and then passes through the substrate once again and out of the media) is less than 30%. In an alternative embodiment, the second layer is a material with insulating properties or insulating and reflective properties.

The third layer 8 is referred to elsewhere herein as the retention layer. It is formed of a material that (a) absorbs a percentage of light energy passing through it; (b) displays a glass transition temperature which is above room temperature; (c) is rubbery, when above its glass transition temperature, with sufficient elasticity to permit it to conform to the contour of the distortion formed in the second layer by the expansion of the first layer, when the first active material layer is heated, and; (d) displays sufficient rigidity and strength below its glass transition temperature such that it will hold the second and first layers in the stretched, expanded condition which was effectuated while the first active layer was heated, even though the first layer has cooled to ambient temperature. It should be noted that in some embodiments, only the third layer remains in a deformed condition, and the first layer returns to its undeformed state. Data are then read from the retention layer.

Writing is achieved in one embodiment by focusing two cooperating monochromatic light beams, chosen from a wide spectrum of available light wavelengths, onto the central reflective second layer 6 from opposite sides of the media, and modulating these beams with data. The angle of incidence of both these beams is preferably adjusted to about 90 degrees (e.g., 90 degrees ±1 degree) in order to assure that the beams create a circular cylinder of energy within the active media. The first of these beams will pass through the substrate 10 and expansion layer 4, be reflected off the central reflective layer 6, pass through the expansion layer once again and exit through the substrate. The second of these beams will pass through an optional protective layer 12, and the retention layer 8, be reflected off the central reflective layer, pass through the retention layer once again and exit through the optional protective layer, if present.

The first beam, referred to herein as the record beam and indicated in FIG. 2 with arrow 14, causes the heating and subsequent expansion of the expansion layer 4 in the direction away from the substrate 10, thereby forming a bump, as illustrated by reference numeral 16 in FIG. 3 in the direction of the reflective layer. The reflective layer reverses the direction of this modulated incident beam and returns the incident beam's light energy directly back along the same path from which it came, thereby heating the expansion layer on both entrance and exit. Because the reflective layer does not display 100% reflectance, a portion of the energy incident upon the reflective layer will heat this reflective layer above ambient temperature. The material comprising the reflective layer is chosen to be malleable and deformable during the course of the recordation process. Therefore, the bumps formed by the modulated record beam in the expansion layer will protrude into the soft reflective layer and the reflective layer will conform around these bumps.

The data used to modulate the record beam are binary, digital, i.e., the data are composed of either ones or zeros, the presence of a bump edge indicating a one and the absence of a bump edge representing a zero. These "digital bits" are presented to the record beam at a preselected rate. Therefore it is known beforehand when a zero or one can be written. A synchronization signal can be used which is composed of very short pulses that indicate the start of the period of time during which a bump can be written. These short pulses themselves occur at the same preselected and constant rate as employed by the data's "digital bit stream". In the present invention, the synchronization signal is also used to modulate the second beam, known as the erase beam.

The modulated second beam, known as the erase beam (indicated with arrow 18), heats the retention layer 8 in synchronism with the data presented to the record beam. This erase beam is turned on at the start of the "bit period" and turned off before the end of the "bit period"; the time the first beam is first turned on for each "bit period" being dictated by the synchronization signal described above. This assures that the retention layer is above its glass transition temperature when the record beam is writing each individual data bit on the media.

The retention layer material is therefore soft during the bit recording process and allows the expansion layer bumps, overlayed with reflective material from the reflective layer, to protrude into its volume. Before the record beam completes the writing of any individual data bit, the erase beam turns off. This causes the retention layer to cool while energy is still being applied to the bump forming process taking place in the expansion layer. By this mechanism the cooled retention layer, which has reached its glass transition temperature, holds the reflective material covered bumps into position after the expansion layer has cooled.

Since the above described method does not require the use of two different or specific wavelengths of light energy for separate heating of the retention and expansion layers, any monochromatic beams of light that are absorbed by these layers, can be employed for the write/erasure process. Further, since (a) light energy is injected into the expansion and retention layers separately in a physical as well as a timing sense; (b) the reflection layer acts to isolate the transfer of energy between these two layers; and (c) the reflection layer also acts to cause each light beam to double pass through each active layer separately, without losses from any other intervening layers of material, more light energy can impinge on each of these layers during the write/erase process without causing deleterious thermal interactions between the active layers. Therefore the novel media being disclosed can be constructed such that it will display lower light energy absorption as compared to the prior art.

Still further, since the described media does not require the use of specific wavelengths of light, single dyes or combinations of dyes which absorb energies over all wavelengths, preferably excluding the read wavelength, can be employed to increase the sensitivity of the media to the heating effects of the recording and erase beams.

The amount of power that is injected into the expansion and retention layers may be separately variable by changing the record and erase beams' pulse width and height. This allows closer control of bump formation and retention during the recording and erasure process as well as the opportunity to use a wider range of material as the basis for the three active layers of the unique triple layer media being disclosed.

The new triple media in conjunction with the dual beam cooperative recording mechanism previously described has the ability to directly erase and write on media which has been previously recorded on without the need to erase this media first. In this mode, when the erase beam softens the retention layer, such that it is above its glass transition temperature, it will release any bumps previously imbedded in the retention layer and allow the expansion layer to relax at these localized points. If the recording beam is writing a "zero" at this time, i.e., the beam is off, the localized point involved will relax or remain relaxed regardless if it had a "one", i.e., a bump, written on it before or had a "zero", i.e., was already in its relaxed state, written on it before. If the recording beam is on, the localized point involved will expand or remain expanded regardless if it had a "zero", i.e., was in its relaxed state, before or had a "one", i.e., a bump written on it before.

Reading is achieved by focusing a monochromatic light beam, chosen from a wide spectrum of available light wavelengths, through the substrate 10, through the first material layer 4, and onto the reflective layer 6. Taking into consideration the losses through the retention layer and substrate, this reflective surface provides the percentage of reflection necessary to allow reading of the bumps (data) by a standard compact disk player read mechanism.

Erasing is achieved by focusing a monochromatic light beam, chosen from a wide spectrum of available light wavelengths, through the optional protective layer, if present, through the third material layer 8 and onto the central reflective layer. This erase beam heats the retention layer above its glass transition temperature and thereby allows any bumps previously imbedded in the retention layer to be released. Since the expansion layer is not being heated at this time and is cool, contraction forces in this layer will locally pull the expansion layer into a flat configuration and the bumps (data) will disappear.

The expansion layer is formed of a material or combinations of materials which display some light absorption at the wavelength of the record beam. The wavelength of this beam of light may be chosen from a wide spectrum of available light wavelengths. The degree of absorptivity may vary from wavelength to wavelength and from expansion material to expansion material. For example, however, this degree of absorptivity could be between 20% and 40% in the wavelength range from 850 nm to 650 nm. To maintain the ability to read data recorded on this unique optical media on standard detection mechanisms, such as those found on conventional compact disk players, a maximum double pass absorption at the compact disk read wavelength (780 nm) of 10% is preferred. In addition, unlike prior art, there is no fundamental reason which requires that the recordation wavelength be different from the erasure wavelength. The recordation wavelength chosen can and is preferred to be, the same wavelength as used for erasure.

The expansion layer has a high coefficient of thermal expansion, particularly when compared to the other layers of the medium. Coefficients above about $1 \times 10^{-4}/°$ C. preferred, with those greater than about $5 \times 10^{-4}/°$ C. particularly preferred and those greater than about $7.5 \times 10^{-4}/°$ C. most preferred.

In addition, the expansion layer material is rubbery at ambient temperature, i.e., having a high coefficient of elasticity, to the extent that it will expand readily during recordation without exceeding its upper expansive limit. When at room temperature, the expansion layer material is near or above its glass transition temperature, which is preferably below 30° C.

The reflective layer 6 serves to reflect light (e.g. more than 25% of the light striking it) back through the expansion layer 4 for the purposes of improved data recordation and data detection. During the recordation process the reflective properties of the reflective layer causes the recording light beam to double pass through the expansion layer, thus doubling the effective light beam path inside the expansion layer. Energy for the purposes of heating and thus expanding the expansion layer is thereby absorbed for both directions of the recordation light beam.

The reflective layer also serves to thermally and optically isolate the expansion layer from the retention layer, which overlays the reflective layer. Separate laser light source acting in cooperation, can be employed for the reading/erasure process. Alternatively, the same source could be used by employing, for example, a beam splitter.

So that recorded data is able to be read by standard compact disk player reading mechanisms, the reflective layer provides the means for reflecting light energy incident on the media's substrate back through the media's substrate, after this light energy has been modulated by recorded data. Since the reflective layer is deformable it conforms to the shape of the deformations in the expansion layer, which represent the recorded data. Therefore, an incident read light beam is effectively modulated by quarter wavelength interference as well as light scattering.

The retention layer 8 is formed of material or combinations of materials which display at least some light absorption at the wavelength of the erase beam. The wavelength of the erase beam 18 light may be chosen from a wide spectrum of available light wavelengths. The degree of absorptivity may vary from wavelength to wavelength and from retention material to retention material but may be for example about 30% to 45% at wavelengths between 650 nm and 860 nm. To facilitate the ability to accurately erase data recorded on this unique optical media it is desirable to be able to read data through the retention layer. Therefore it is preferable to limit the maximum double pass absorption of the retention layer at the erase wavelength to less than 80% even though the system can be made to work with more absorption. In addition, unlike prior art, there is no fundamental reason which requires that the erasure wavelength be different from the recordation wavelength. The erasure wavelength chosen can and is preferred to be, the same wavelength as used for recordation.

The retention layer material has a glass transition temperature which is above ambient temperature and very much above the glass transition temperature exhibited by the expansion layer. In general, this glass transition temperature will range from about 50° C. to 300° C., preferably it will lie between 75° C. to 125° C. When above the glass transition temperature, the material is rubbery with a sufficient elasticity to permit it to deform to the contour of the distortion formed in the reflective layer caused by the expansion of the expansion layer without exceeding its elasticity limit.

In further embodiments of the invention, the retention layer has a high thermal conductivity, causing it to rapidly rise in temperature above its glass transition temperature when light energy from the erase beam is applied. After the erase beam has been turned off, this high thermal conductivity serves to foster the rapid cooling of the retention layer to its glassy state. Since, at this time, light energy is still being applied to the expansion layer by the record beam, the expansion layer is still in its enlarged condition and the reflection layer is still locally deformed by the expanded expansion layer. The cooled retention layer can now hold, because of tight bonding between the reflection and expansion layers, the deformed reflective and expansion layers in their extended positions after the write beam is no longer exciting the expansion layer and the expansion layer has cooled. A retention layer having a thermal conductivity of at least about $2.5 \times 10^{-4}$ cal/((cm$^2$/° C.)(sec/cm)) will provide adequate results.

Certain embodiments of the present invention also include a protective layer 12 placed over the retention layer 8 to protect it from damage due to contact with external objects. Characteristics of the protective layer are:

(A) low absorption of light energy at all wavelengths, but particularly at the erase wavelength.

(B) sufficiently compliant to allow the deformations in the reflective layer to easily protrude into it and thereby offer little resistance to their formation.

(C) sufficient thickness such that the bumps formed in the reflective layer are not transmitted through the retention layer, into the protective layer and then subsequently through the protective layer to the outer surface.

(D) high thermal conductivity to enable it to serve as a heat sink for purposes of rapid cooling of the retention layer, immediately after the erase beam impinging on its surface is turned off. A thermal conductivity of at least $5 \times 10^{-4}$ cal/((cm$^2$/° C.)(sec/cm)) will provide adequate results. The protective layer is preferably $2 \times 10^{-3}$ cal/((cm$^2$/° C.)(sec/cm)).

The various layers described above are arranged on a substrate with the expansion layer which may be directly bonded to the overlaying substrate, the reflective layer bonded to and directly overlaying the expansion layer, the retention layer bonded to and directly overlaying the reflective layer and the optional protective layer bonded to and directly overlaying the retention layer. The substrate itself is formed of a rigid transparent material which permits substantially full transmission of light at all wavelengths. The substrate is sufficiently thick and rigid to provide structural integrity to the medium and does not deform in response to pressure caused by expansive forces in the expansion layer. Bulges in the expansion layer, caused by its thermal expansion upon absorption of the record beam's light energy, protrude away from the substrate due to the substrate's rigidity. With this layer arrangement, the bulges protrude into the reflective and retention layers, causing their deformation as described above.

The thickness of the layers will be selected in accordance with the optics of the system. For example, in order to maintain the minimum mark size during data recordation with the greatest write sensitivity during recording, the laser beam should be maintained as small as possible as it passes through the expansion layer. Accordingly, most of the expansion layer 4 should be within the focal depth of the record beam. For recording systems having optical parameters similar to those found in standard compact disk players, the record beam is diffraction limited and has a focal depth of approximately 1.0°2.0 microns.. In such cases, best results can be obtained with an expansion layer preferably 1.0 microns or less.

In a similar manner, to maintain the minimum erasure area during the course of data erasure, the laser beam should be maintained a small as possible as it passes through the retention layer. Accordingly, most of the retention layer 8 should be within the focal depth of the erase beam. For erasure systems having optical parameters similar to those found in standard compact disk players, the erase beam is also diffraction limited and has a focal depth of approximately 1.0-2.0 microns. In such cases, best results can be obtained with a retention layer having a thickness similar to that of the expansion layer or approximately 0.5 to 1.5 microns, preferably 1.0 microns or less.

The substrate and the optional protective layers are considerably thicker, the substrate layer being on the order of 1 millimeter or more and the optional protective layer being on the order of tens of microns, in view of their respective functions (i.e., the substrate must be thick enough to impart rigidity to the medium and the protective layer must be thick enough to protect the data protrusions from external abuse). The substrate is preferably 1.2 mm. The protective layer is preferably 2 μm.

The materials used in forming the layers will be selected on the basis of the properties indicated above, i,e., transparency, reflectivity, absorptivity, glass transition temperature, elasticity and thermal expansivity. The preferred materials for all layers except the reflective layer are amorphous polymers. Examples of such materials are rubbers, natural rubbers such as butyl rubbers, silicone rubbers, natural rubbers and styrene- butadiene rubbers; polymers such as cellulose acetate, cellulose acetate- butyrate, polystyrene, polysulfonamide, polycarbonate, cellulose nitrate, poly(ethyl-methacrylate), poly(vinyl butyryl), aromatic polyesters, polyamides, acrylic polymers, polyvinyl acetate, silicone resins, alkyd resins, styrene- butadiene copolymers, vinyl chloride-vinyl acetate copolymers, nitrocellulose, ethylcellulose and polyvinyl alcohol; and substances such as gelatine glue, casein, egg albumin and dihydroabietyl alcohol. Materials with high elasticity such as elastomers and polymers with elongations greater than 15% are preferred for construction of the expansion layer. Materials with relatively high glass transition layer notably greater than 50° C., with elongations greater than 5%, such as those found in the epoxy family of resins, are preferred for construction of the retention layer.

The reflective layer may be formed of any reflective material which is sufficiently elastic and malleable to conform to the bulges protruding from the expansion layer. The material should not unduly constrict bump formation and should not become substantially work hardened over the number of desired write and erase cycles. Examples of such material are gallium, aluminum, copper, silver, gold and indium. Other examples are alloys, particularly eutectic alloys of bismuth with tin or cadmium.

The absorptive characteristics of the various layers may be imparted thereto using methods that will be apparent from the above disclosure and known to those of skill in the art. Since the media of the present invention need not be wavelength specific, a broad range of dyes or pigments are available for this purpose. In addition, except for the ability to pass a portion of the wavelength energy which is employed for the purpose of reading the recorded data, these dyes or pigments need not be wavelength specific and may therefore absorb light energy over a broad spectrum of wavelengths. Since standard compact disk player detection mechanisms require a minimum of 70% reflection, as seen by light which is incident on the substrate side of the media, and employ laser diodes which function at 780 nm wavelength for the purpose of reading data, it is preferable to limit the maximum double pass absorption of the expansion layer at this wavelength to less than 10% even though the system can be made to work with more absorption. Dyes or pigments which may be used singly or in combination are nigrosin blue, aniline blue, Calco Oil Blue, ultramarine blue, methylene blue chloride, Monastral Blue, Malachite Green Ozalate, Sudan Black BM, Tricon blue, Macrolex green G, DDCI-4 and IR26.

The various layers of the media of the present invention are bonded together according to conventional techniques. It is preferred that adjacent layers be optically coupled to one another such that substantially all light propagated through one layer enters, or is reflected off, the adjacent layer.

The media of the present invention may be fabricated in accordance with conventional techniques, whereby the various layers are applied in succession by coating over a substrate. Knife spread techniques, spin coating techniques and metal vapor deposition are examples of techniques which may be used.

Figure 5:
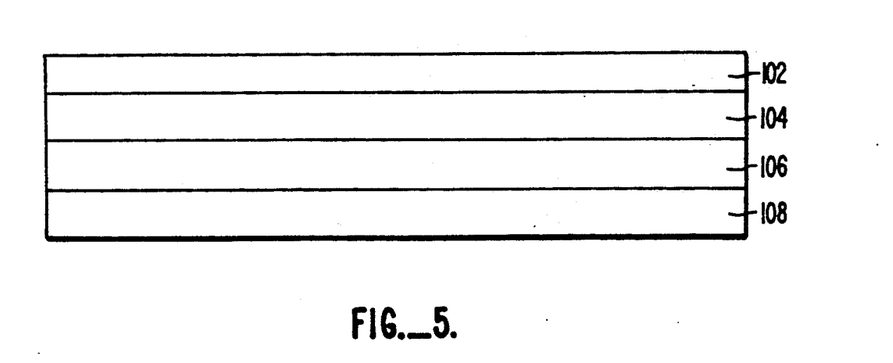
FIG. 5 shows an alternative embodiment of the recording medium shown in FIG. 2.

A second alternative embodiment of the media discussed above is shown in FIG. 5. This embodiment includes a first layer 102, a second layer 104, a third layer 106, and a further layer 108. A substrate and protective layer (not shown) may also be provided. The first layer 102 is the expansion layer, as described above. The second layer 104 is a transparent, malleable insulation layer. The third layer 106 is a retention layer and the fourth layer 108 is a malleable reflective layer. The first and third layers are dye loaded such that the first layer, the expansion layer, will absorb light energy at, for example, 680 nm but not at 830 nm and the third layer, the retention layer will absorb light energy at 830 nm and not at 680 nm. The second, insulating layer allows separate heating of the first and third layers by the use of lasers that emit light at 680 and 830 nm. Therefore data stored on the media can be directly overwritten. In fact by using cooperating and synchronized write and erase beams as described below all of the same benefits are achieved, except for the ability to use the same wavelength of light for both record and erase. The second layer is preferably soft and malleable and can not hold the first layer in a stretched, expanded state.

Figure 4:
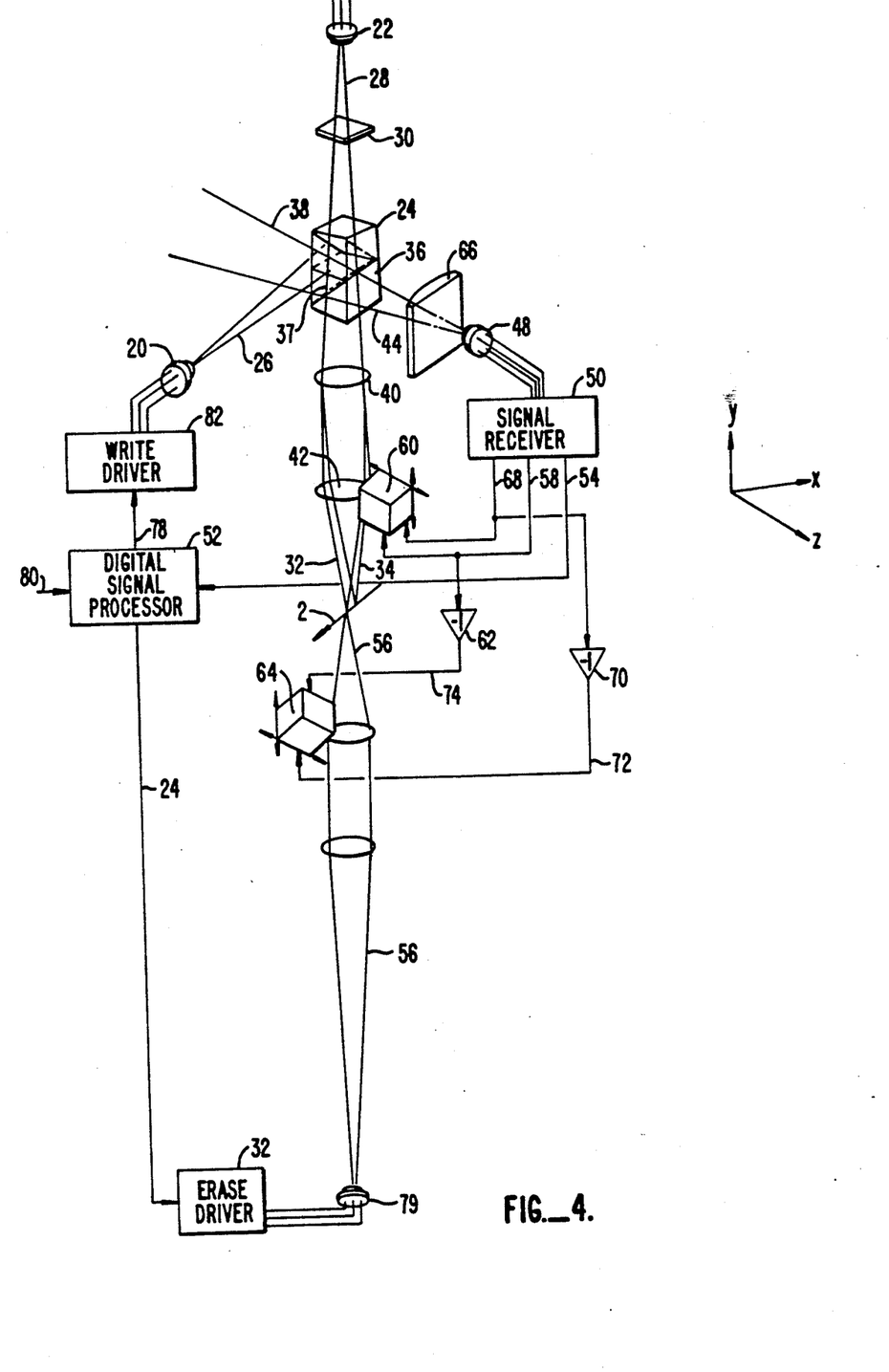
FIG. 4 is a block diagram of a system which can be used for recording, reading and erasing data on an optical storage medium in accordance with the present invention.

FIG. 4, illustrates one embodiment of an electro-optical system for recording data on the storage media in accordance with the present invention and includes three separate laser beam sources, one for writing, one for erasure and one for reading. In this scheme three laser sources are included in order to provide direct overwrite capability. Write beam diode 20 and read beam diode 22 are both directed at a first, highly polarizing beam splitter 24. The write beam diode 20 is rotated so that the merging write beam 26 is S-polarized with respect to the beam splitter 24, while the read beam 28 is P-polarized, with respect to the beam splitter 24, by ¼ wavelength plate 30. Beam splitter 24 is itself arranged so that it reflects a high proportion of the write beam 26 downward along, for example, the Y axis while transmitting a high proportion of the read beam 28, with the result that the reflected write beam and the transmitted read beam are offset but parallel, forming two spatially separated beams 32 and 34 respectively toward the recording medium 2. The highly polarized beam splitter 24 preferably reflects at least 90% of write beam 26 and transmits at least 90% of read beam 28, with about 95% to 98% preferred for both polarization directions.

A second beam splitter 36, less polarizing than the first, is situated in the path of two parallel beams 37 emerging from the first beam splitter. The second beam splitter 36 is rotated 90 degrees with respect to the first beam splitter 24, with the result that any light reflected from the Y axis is directed along the Z axis. Also due to the change of direction, the second beam splitter 36 causes reflection of light from the read beam 28 transmitted through the first beam splitter 24. Since the second beam splitter 36 is less polarized than the first, however, it transmits preferably from about 10% to about 50% of the light from the read beam, reflecting substantially the remainder. In a convenient arrangement, 80% of the read beam is reflected along the Z axis to loss 38 and 20% is transmitted along the Y axis toward the recording medium. For light polarized in accordance with the write beam 26, however, it is preferred that at least about 80% be transmitted down along the Y axis toward the recording medium, with the rest reflected to loss 38, exclusive of the amount absorbed. Convenient values for the write beam are 88% transmission and 10% reflection.

A collimating lens 40 and an objective lens 42 focus the write and read beams on the recording medium 2, particularly the reflecting surface therein. The reflecting surface reflects light less any light which has been absorbed by the medium, back along the same axes, superimposed over the incident beams 32 and 34, toward the second beam splitter 36. The reflected read beam 34, due to its polarization, is partially reflected and partially transmitted as before, with the same percentages. The reflected beam 44, however, is directed along the Z axis toward the photodetector 48. In the specific example given above, 80% of the read beam reflected from the recording medium will thus be directed toward the photodetector. The reflected write beam will also be present. The majority of this beam will be transmitted through the beam splitter 36 as before, with a small reflected portion (about 10% in the specific example) being reflected toward the photodetector.

The write beam 26 will be of a sufficient intensity to cause a recording response in the medium. The read beam 28 will generally be of lesser intensity. Specifically, power of the write diode 20 and the read diode 22 are expected to be about 30 mW and 5 mW respectively. An advantage of this arrangement is that a relatively small portion of the write beam reaches the photodetector 48. This proportion may be reduced even further by choosing a read beam wavelength which is different than that of the write beam and separating these two beams by use of appropriate filters. By proper wavelength selection of both the write and read beam it is possible to implement an embodiment of the current invention which does not require the use of polarizing elements to sufficiently separate the write and read beams during the recordation process.

The two beams, write beam 32 and read beam 34, preferably impinge upon the medium 2 such that the focal point of the read beam scans the media surface slightly ahead of the focal point of the write beam. The exact distance that the focal point of read beam 34 is ahead of write beam 32 is not critical for the media 2 is being rotated at a constant linear velocity. Therefore by knowing the distance between read beam 34 and write beam 32, the time at which a bump edge, detected by the read beam, will appear beneath the write beam can be easily and precisely determined. For best results, however, read beam 34 should be separated from write beam 32 by at least 0.5 microns, to assure that they do not overlap, with a total separation of less than 2 microns, to allow sufficient focusing action by a single set of optics.

The data derived from read beam 34 are detected by photodetector 48 and signal receiver 50. After processing by signal receiver 50 they are sent to digital signal processor 52 along line 54, where the data are employed for proper synchronization of the drive write beam 26 and erase beam 56. A processed version of the read data is also sent on line 58 to writing and reading focus and tracking servo unit 60 and, through inverting amplifier 62, to erase beam focus and tracking servo unit 64. These two units, 60 and 64, employ the read data for the purpose of causing write beam 32, read beam 34 and erase beam 56 to be in focus and the proper position for performance of recordation, reading and erasure of data. It should be recognized that reflections of the erase beam could be monitored in a manner similar to that described above and, therefore, the read beam could be eliminated in certain embodiments.

The reflected read laser beam 44 from disk 2 is sent through cylindrical lens 66 to photodetector 48. This lens causes the beam to gradually vary its shape along its path, first as an oval in a longitudinal direction, then as a circle, and finally as an oval in the transverse direction. This beam shape varies as function of the distance the read beam's focal point is away from the reflective surface of the media. The photodiodes in photodetector 48 are divided in four sections, all of which provide outputs when read beam 45 is in focus. However, when the disk is too close, the longitudinal direction beam supplies a light signal to the upper and lower photodiodes, causing only these two diodes to provide outputs. On the other hand, if the disk is too far, only the left and right diodes provide an output. By amplifying the difference in output derived from these four diodes, a focus error signal is obtained. This focus error is amplified and placed on line 68. This line splits and drives write beam and read beam focus and tracking servo 60 directly and erase beam focus and tracking servo 64 through inverting amplifier 70 such that write beam 32, read beam 34 and erase beam 56 remain in focus.

A heterodyne method is one approach that can be employed by the present invention for the purposes of correcting for tracking error. This method involves monitoring whether or not read laser beam 41 is applied equally to four division photodiode detector 48. The photodetector assembly is a circular array of photodiodes divided in four quadrants (A through D). A is the upper left hand quadrant, B is the upper right hand quadrant, C is the lower left hand quadrant and D is the lower right hand quadrant. When the beam is located at the center of the track, the output of (A+C)−(B+D) becomes zero. However, if the beam is deflected from the center of the tract the waveform of (A+C)−(B+D) changes based on the direction and extent of the deflection. This signal is placed on line 58. This line splits and directly drives write beam and read beam focus and tracking servo 60 and erase beam focus and tracking servo 64, through inverting amplifier 62, such that read beam 34, write beam 32 and erase beam 56 stay "on track".

Note that erase beam 56 should be properly focused and track the same point as being addressed by write beam 32. The characteristics of erase servo 64 are adjusted to exactly match the characteristics of write/read servo 60 and that movement of the disk toward the read beam is always matched by an equal an opposite move away from the erase beam. Therefore, one way of correcting for erase focus, as shown in this embodiment, is to first focus the erase beam manually and thereafter correct for focus by inverting the focus control signal appearing on line 68, using inverting amplifier 70, and employing this signal to drive erase servo 64 through line 72. The same concept if used in this embodiment for assuring that erase beam 56 always is on the same track as write beam 32. In this case a movement of a track toward the left as viewed from the top of the disk appears as a movement toward the right as viewed from underneath the disk. Therefore, the erase beam is first aligned with the record beam manually and thereafter corrected for alignment by inverting the tracking control signal appearing on line 58, using inverting amplifier 62, and employing this signal to drive erase servo 64 through line 74.

There are other means of assuring that erase beam 56 is properly focused and tracks the exact same point as being addressed by record beam 32. By adding the elements equivalent to read laser 22, ¼ wavelength plate 30, beam splitter 24, second beam splitter 36, cylindrical lens 66, photodetector 48, and signal receiver 50 to the erase beam optical path, erase beam 56 would be capable of tracking and focusing independent of read beam 34. No manual beam alignment or focusing set up procedure would be required. Additionally, by making the "erase-read" beam coaxial with erase beam 56, these added components would permit reading data stored, and currently being altered, on the media by the action of record beam 32. Comparing signal 78, which drives the record laser, with the signals detected by the "erase-read" photodetector, allows simple and reliable identification of the track currently being overwritten. This information would be employed to drive erase beam focus and tracking servo 64 so that erase beam 56 always addressed the same point being addressed by record beam 32.

In the preferred embodiment, the write 34 beam and erase laser beam from the erase laser 79 are digitally modulated in accordance with a version of the data appearing on line 80. However, a workable mechanism for recording, reading and erasing data on a storage media constructed in accordance with the present invention, can be derived by employed an erase beam which is continuous and not modulated. In this embodiment, the erase beam's light energy would be carefully chosen to provide softening of the retention layer during the recordation process, but still allow the retention layer to cool to its glass transition temperature, as previously described, before the expansion layer had cooled to its relaxed condition. It should be noted that when this process is employed, it is not necessary for the continuous erase beam to be focused on the exact same spot as that focused upon by the write beam. In fact, by having the continuous erase beam focus on a spot which slightly precedes the spot focused upon by the write beam, an additional measure of erasure control is provided. The erase beam would then preferably precede the write beam by about 2 $\mu$m.

The preferred embodiment utilizes a processed version of the data appearing on line 80, which is synchronized with the write laser drive signal appearing on line 78 to drive the erase laser 56. Digital processor 52 in conjunction with data read by read beam 34, appearing on line 54, creates a modulated erase beam which heats the media's retention layer in synchronism with the data to be recorded. Signal processor 52 could, for example, be a ADSP2100 manufactured by Analog Devices. Erase beam 56 is turned on at the start of the record "bit period" and turned off before the end of the record "bit period". The retention layer 8 of FIG. 3 is therefore soft during the bit recording process and allows the expansion layer bumps 16, overlaid with reflective material from the reflective layer to easily protrude into volume of the retention layer 8. It also assures that retention layer 8 begins cooling toward its glass transition temperature while the expansion layer 4 is still being heated by record beam 32. By this mechanism the retention layer will reach its glass transition temperature before expansion layer 4 relaxes to its flat state, holding the reflective material covered bumps into position after the expansion layer has cooled.

It is necessary to synchronize the data appearing on record beam 32 and erase beam 56 with any data that may be already recorded on the media. This is done to assure that the write/erase action occurs only at the bump transitions that have already been formed in the media. If this synchronizing action is not performed, a mixture of the two data streams would be recorded on the disk, resulting in an inability to recover both the previously and newly recorded data. Given the synchronization mechanism described above, the scheme being presented provides for direct overwrite recording. If a bit formed in previously recorded media passes between the record/erase beams of the present invention, it will be removed or remain in place depending upon whether or not the record beam is attempting to record a data bit at that location. If a data bit is being recorded, the energy from record beam 32 will force expansion layer 4 of FIG. 2 to remain expanded at that point after the erase beam is no longer active. If no data bit is to be recorded at that point, the expansion layer will not be forced to remain in an expanded condition because there will be no energy available from write laser 9. Erase beam 56 will soften retention layer 8 and release the expansion layer, allowing it to relax and assume a flat condition. Therefore the present invention effectively erases data bumps during the recordation process and provides for direct overwrite capability.

If a "virgin" disk, i.e., one which has never been recorded on, is utilized, signal processor 52 would receive no intelligible data on line 54 from signal receiver 50 and read photodetector 48 and fall into a self synchronization mode to effect proper recording.

The process of erasure separate from recording is the same as the process of recordation described above except that no signal is placed on line 78. Thus write driver 80 and write laser 20 are inactive. This results in a single erase beam impinging on the disk which is synchronized with the data already appearing on the disk. Since there is no write beam to cause expansion layer to expand, the heated retention layer 4 will soften and release any data bumps 16, which will allow them to assume their relaxed, flat condition. A non-modulated, non-synchronized erase beam can also be employed for the same purpose.

The signal receiver, the signal processor, the write driver, and the inverting amplifiers are of the type readily known to one skilled in the art. Table 1 lists one of a wide variety of commercially available components that could be used in the invention described herein.

TABLE 1

| COMPONENT INFORMATION | |
|---|---|
| Component | Model and Manufacturer |
| Write diode 20 | Model No. SDL-5410 Manufactured by Spectra Diode |
| Read diode 22 | Same as write diode |
| Beam Splitter 24 | From Olympus TAOHS-LC3 |
| ¼ wavelength plate 30 | From Olympus TAOHS-LC3 |
| Beam splitter 36 | From Olympus TAOHS-LC3 |
| Photodetector 48 | From Olympus TAOHS-LC3 |
| Signal receiver 50 | Rocky Mountain Z Channel Servo Amplifier |
| Signal processor 52 | Analog Devices ADCP-2100 |
| Servo 60 | From Olympus TAOHS-LC3 |
| Inverting amplifier 62 | Teledyne Philbrick TPOO32 |
| Servo 64 | From Olympus TAOHS-LC3 |
| Inverting amplifier 70 | Teledyne Philbrick TPOO32 |
| Driver 82 | Meleos Griot Diode Laser Driver 06 DLD001 |

Figure 6A:
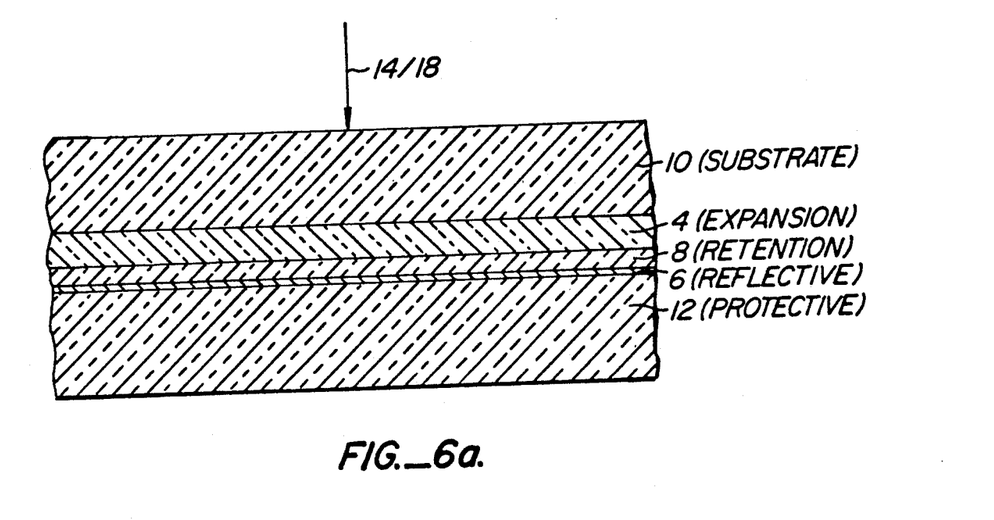
FIGS. 6a and 6b illustrate an alternative embodiment of the invention.
Figure 6B:
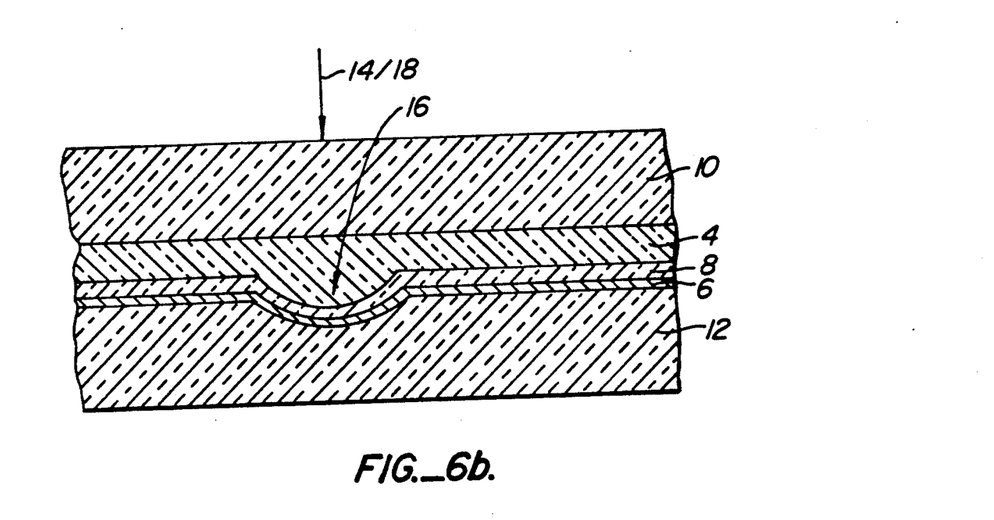

Two alternative arrangements of the media, both within the scope of the invention, are shown in FIGS. 6 and 7. In FIGS. 6a and 6b, the expansion layer 4 is bonded directly to the substrate 10, the retention layer 8 is bonded directly to the expansion layer 4, the reflective layer 6 is bonded directly to the retention layer 8, and the compliant protective layer 12 is bonded directly tot he reflective layer 6. The arrow 14/18 represents the direction of approach of the incident light, which will be the same for the record, read and erase beams. Light passing through the expansion layer 4 must first pass through the retention layer 8 before it is reflected back by the reflective layer 6, and upon reflection, passes back through both layers again.

The retention layer 8 in this arrangement is heated indirectly during recordation by conduction from the expansion layer 14.

Figure 7A:
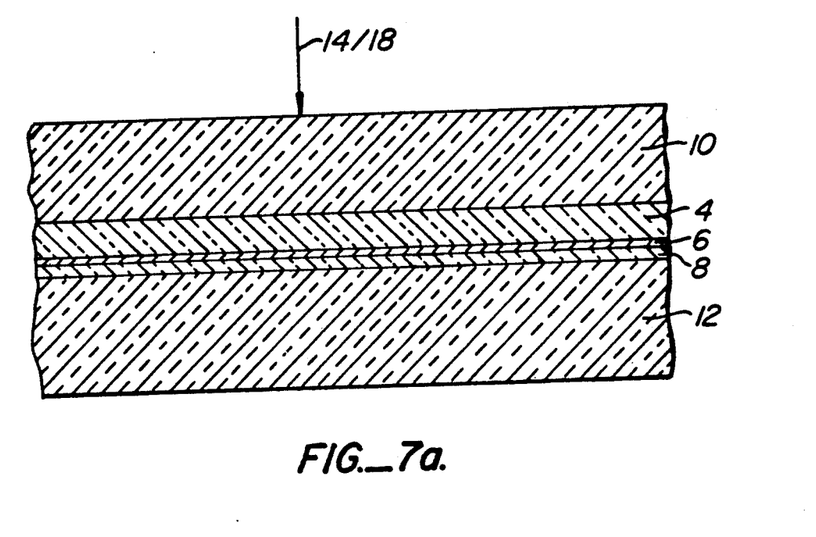
FIGS. 7a and 7b illustrate another alternative embodiment of the invention.
Figure 7B:
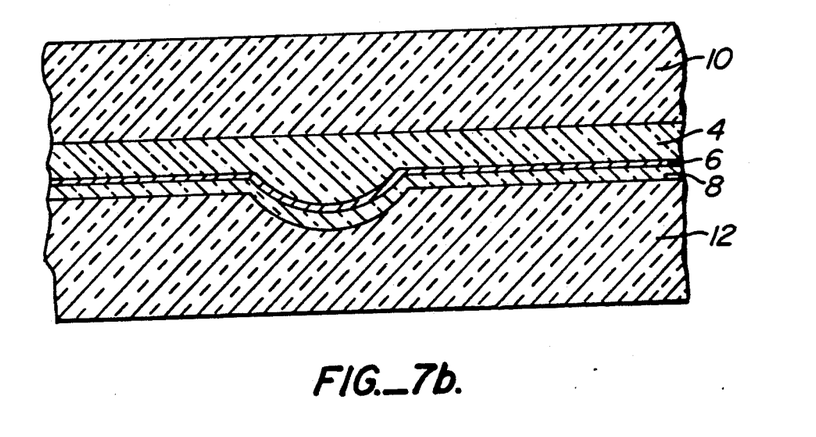

In FIGS. 7a and 7b, the retention layer 8 and reflective layer 6 are reversed, so that light passing through the expansion layer 4 is reflected immediately back through it by the reflective layer 6, avoiding the retention layer entirely. The retention layer derives its heat entirely by conduction from the expansion layer through the reflective layer.

In both cases, the complaint layer 12 acts as a heat sink to draw heat from its adjacent layer. In this way, the compliant layer promotes the rapid cooling of the retention layer after the record beam is turned off and before the expansion layer has time to return to its flat contour. The retention layer thus returns to its glassy state while still conforming in shape to the pit formed during recordation, thereby fixing the pit.

The thicknesses of the various layers will be selected in accordance with the optics of the system, including the record, read and erase functions. For instance, in order to maintain the minimum mark size during data recordation with greatest write sensitivity during recording, the laser beam should be maintained as small as possible as it passes through the expansion layer. Accordingly, most of the expansion layer should be within the focal depth of the record beam. For recording systems having optical parameters similar to those found in standard compact disk players, the record beam is diffraction limited and has a focal length of approximately 1.0 to 2.0 microns.

In such cases, beast results can be obtained with an expansion layer having a thickness of approximately 0.5 to 1.5 microns, preferably 1.0 micron or less. Furthermore, in cases where the retention layer lies between the expansion layer and the reflective layer, as shown in FIG. 6, the retention layer should be as thin as possible, since it will lie in the center of the focal depth. Accordingly, a retention layer of approximately 0.25 to 1.0 micron is preferred, with approximately 0.5 micron to 0.75 micron most preferred. In general, however, the expansion and retention layers will be as thin as possible while still retaining their expandable and retentive characters, respectively.

The substrate and the protective layers are considerably thicker, the substrate layer being on the order of 1 millimeter or more and the protective layer being on the order of tens of microns, in view of their respective functions, i.e., the substrate must be thick enough to impart rigidity to the medium, and the protective layer must be thick enough to protect the data protrusions from external abuse.

The expansion layer is formed of a material which is absorptive of light at the wavelength of the record beam. The expansion layer is only partially absorptive at this wavelength, thereby permitting a double pass of the record beam. The degree of absorptivity may vary, although in general, a double pass absorption of about 40% or greater will provide the best results. In preferred embodiments, the double pass absorption is at least about 40% and less than 90%, and in particularly preferred embodiments, the absorptivity is from about 50% to abut 85%. A double pass absorption of around 50% helps to create a column of nearly constant temperature material in the expansion layer, eliminating high thermal gradients through the expansion layer that occur with single pass recording. This improves mark formation and definition. In addition, the expansion layer is at least partially transmissive of light at the wavelength of the erase beam. Although this may vary widely as well, in most applications a transmissivity of at least about 60%, preferably at least about 80%, at this wavelength will provide the best results.

The expansion layer is further categorized by a high coefficient of thermal expansion, particularly when compared to the other layers of the medium. Coefficients above about $1 \times 10^{-4}$° $C^{-1}$ preferred, with those greater than about $5 \times 10^{-4}$° $C.^{-1}$ particularly preferred, and those greater than about $7.5 \times 10^{-4}$°$C.^{-1}$ most preferred.

In addition, the expansion layer material is rubbery at ambient temperature, i.e., having a high coefficient of elasticity, to the extent that it will expand readily during recordation without exceeding its upper expansive limit. When at room temperature, the expansion layer material is near or above its glass transition temperature, which is preferably below 30° C.

The retention layer has a set of characteristics distinct from those of the expansion layer. The retention layer is absorptive of light at the wavelength of the erase beam. The wavelengths of these two beams differ in a nonoverlapping manner The absorptivity of light by the retention layer at the erase beam wavelength is preferably at least about 40%, and more preferably at least about 50%. In addition, the retention layer material is transmissive of light at the wavelength of the record beam, preferably at least about 60%.

The retention layer material has a glass transition temperature which is above ambient temperature. This may be below the temperature reached by the expansion layer during data recordation. With direct heating of the retention layer, however (by absorption of light from the record beam), this need not be so. In general, this glass transition temperature will range from about 50° C. to about 200° C., preferably from about 75° C. to about 125° C. When above the glass transition temperature, the material is rubbery with a high enough elasticity, sufficient to permit it to deform to the contour of the distortion formed in the expansion layer without exceeding its elasticity limit.

In further embodiments of the invention, the retention layer has a high thermal conductivity, causing it to rise in temperature above its glass transition temperature through conduction from the expansion layer. The high thermal conductivity also serves to dissipate the heat outward quickly for purposes of cooling the retention layer back to its glassy state after the pit in the expansion layer has been formed, and before the expansion layer returns to its nonexpanded state. In most applications, the thermal conductivity will be at least about $2.5 \times 10^{-4}$ cal/cm2/° C./sec/cm, preferably at least about $5 \times 10^{-4}$.

The reflective layer serves to reflect light back through the expansion layer for purposes of recordation, and also for purposes of data detection. The reflective layer thus reflects at least about 25% of the light striking it, preferably at least about 75% and most preferably at least about 85% of the light striking it during both recordation and reading. The reflective layer is also deformable so that it conforms to the shape of the pit representing the recorded data for purposes of light scattering.

As mentioned above, certain embodiments of the invention also include a protective layer on the underside of the pits to protect them from damage due to contact with external objects. Characteristic of the protective layer is its compliancy, by which it deforms to permit the bumps which are the undersides of the pits to protrude into it. In addition, the compliancy layer is relatively thick when compared to the expansion, retention and reflective layers, such that the bumps are not transmitted through the protective layer to its outer surface. It is also preferred that the protective layer have a high thermal conductivity to enable it to function as a heat sink for purposes of rapid cooling of the retention layer immediately after formation of the bumps. In most applications, a thermal conductivity of at least about $5 \times 10^{-4}$ cal/cm2/° C./sec/cm will provide the best results.

Figure 8:
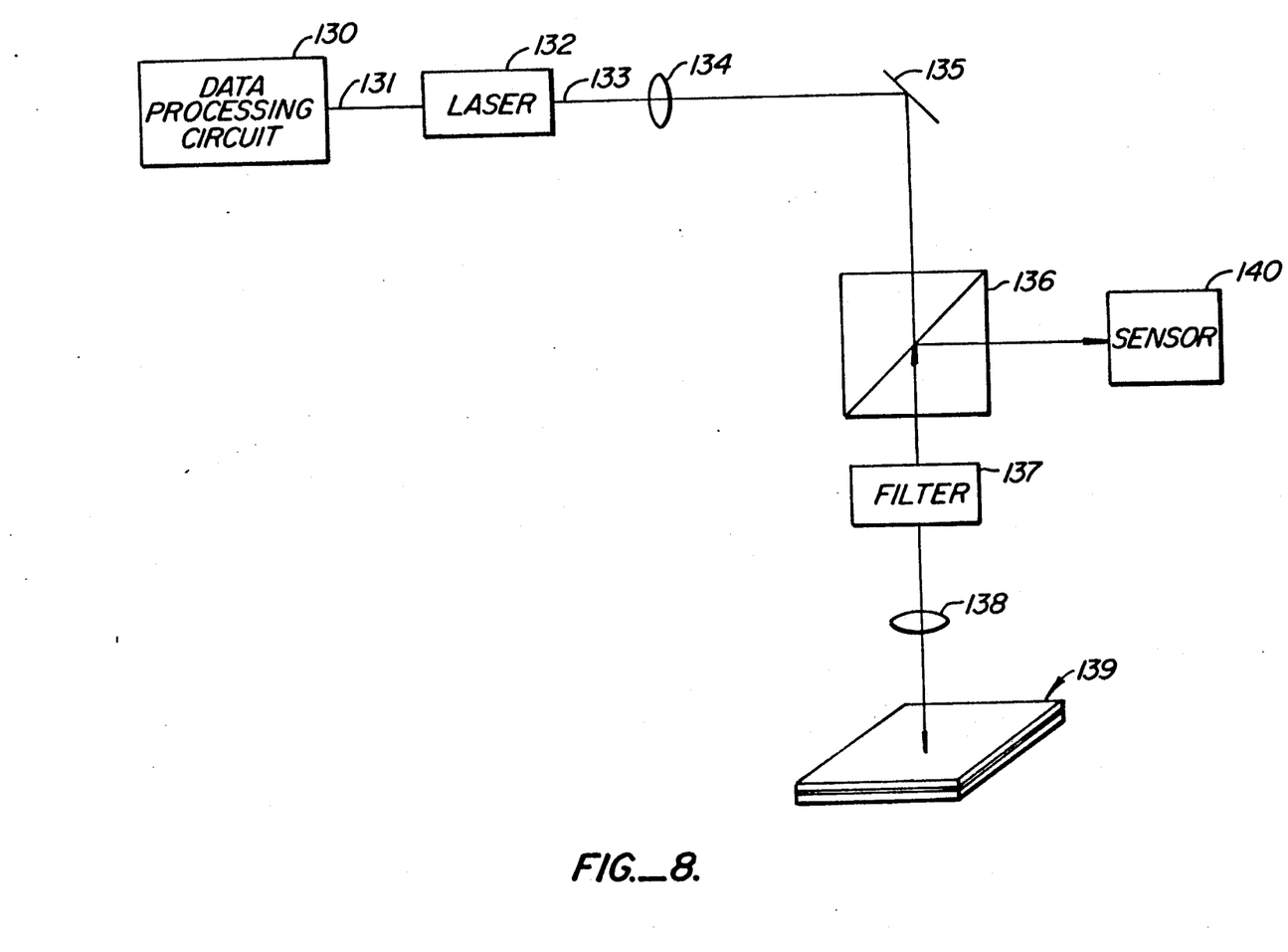
FIG. 8 illustrates an alternative embodiment of an electro-optical system.

FIG. 8 illustrates another example of an electrooptical system for recording data on a data storage medium in accordance with the present invention. The recording system includes a digital data processing circuit 130 whose output on line 131 controls the pulsed variable-intensity laser 132. The laser beam 133 emerging from the laser 132 is collimated by a lens 134 and then reflected by a mirror 135. The reflected beam from the mirror is propagated through a beam splitter 136.

The laser beam emerging from the beam splitter 136 is passed through a filter 137, which may be a quarter-wavelength plate, and then propagated through an objective lens 138 which focuses the laser beams on the moving optical data storage medium 139. Light reflected back from the medium 139 is collected by the lens 138 and propagated through the filter 139 to the beam splitter 136, which propagates the reflected light to a light sensor 140.

The laser 132 is a high power laser (2-15 milliwatts at the media surface) and is either continuous or pulsed. The wavelength of the last beam 133 is the wavelength referred to above as the "record" wavelength, and is either continuous, shaped or pulsed. The effect which it produces on the optical data storage medium of the present invention is seen by comparing FIGS. 6a and 6b. The beam 14/18 enters the medium at the substrate side and passes through the transparent substrate into the expansion layer. The expansion layer, which is absorptive of light at the laser wavelength, rises in temperature due to the absorption, but is kept from localized expansion by the rigid substrate and retention layer (which is in its glassy state). Expansion pressure thus builds up and the retention layer begins to deform in a broad manner. Meanwhile, the temperature of the retention layer rises by conduction from the expansion layer, and possibly by light absorption as well (as described above). As the temperature of the retention layer increases, it approaches the glass transition temperature and a small weak area is formed around the axis of the incident beam. The expansion layer then flows into this weak area allowing expansion to be localized an thereby creating a well-defined bulge 16. The retention layer and the reflection layer deform accordingly to follow the contour of the bulge, and protrude into the compliant layer. When the layer is turned off, the various layers cool. The protective layer acts as a heat sink rapidly drawing heat away from the retention layer through the reflective layer, and the retention layer cools down below its glass transition temperature, increasing its shear modulus to lock in the deformation while the expansion layer is still in its expanded state.

Erasure is achieved by using a laser beam of a different wavelength, one which is absorbed primarily by the retention layer. The expansion layer may also be absorptive at this wavelength to some degree provided that the resulting temperature increase in the expansion layer is not great enough to record a mark. Absorption of the light from this beam by the retention layer will raise it to its rubbery state, at which point the elastic forces in the expansion layer as well as the viscoelastic properties in the retention layer will draw the retention layer (as well as the reflective layer) back to the configuration shown in FIG. 6a.

Similar results are achieved in FIG. 7 in an analogous manner.

In alternative embodiments of the invention a storage medium is mounted on a rigid substrate in which optical data can be recorded through the substrate by a record light beam and from which data so recorded can be read by a read light beam reflected back through the substrate into a detection system designed to read signals reflected through a layer which is substantially the optical equivalent of said rigid substrate. The storage medium may comprise an expansion layer optically coupled to the substrate along an interface therebetween and expandable upon heating to form protrusions on the surface thereof opposite the interface; means for retaining protrusions so formed in said expansion layer upon cooling thereof; and a reflective layer which reflects at least about 25% of the light striking it and is sufficiently elastic to conform to the contour of said surface. The retaining means may be a retention layer comprised of material which has a glass transition temperature substantially above ambient temperature and thereby converts from a glassy state at ambient temperature to a rubbery state at a temperature above said glass transition temperature and the retention layer may be coupled directly to at least one of said expansion layer and said reflective layer while the retention layer may be between the expansion layer and the reflective layer and coupled directly to each. The reflective layer may reflect at least about 85% of the light from said read light beam passing through the expansion layer back through the expansion layer and the substrate.

Alternatively, the storage medium may be mounted on a rigid substrate in which optical data can be recorded through the substrate by a record light beam and from which data so recorded can be read by a read light beam reflected back through the substrate into a detection system designed to read signals reflected through a layer which is substantially the optical equivalent of the rigid substrate, the storage medium comprising an expansion layer of approximately 0.5 to 1.5 microns in thickness optically coupled to the substrate along an interface therebetween and expandable upon heating to a temperature substantially above ambient temperature to form protrusions in the surface thereof opposite the interface; a retention layer of approximately 0.25 to 1.0 micron in thickness optically coupled to the expansion layer and comprised of a material which has a glass transition temperature substantially above ambient temperature and thereby converts from a glassy state at ambient temperature to a rubbery state at a temperature above said glass transition temperature; a reflective layer coupled to the retention layer and which reflects at least about 85% of the light from the read light beam passing through the expansion and retention layers back through the expansion and retention layers and the substrate, and is sufficiently elastic to conform substantially to the contour of said retention layer; and a protective layer on the side thereof toward which the protrusions extend, the protective layer being of material sufficiently deformable to receive the protrusions; the thicknesses of said expansion layer and the retention layer each being about 1/1000th or less of the thicknesses of the substrate and the protective layer, and the retention layer having a thickness of about 1.0 micron or less. The record light beam and the read light beams may each be substantially monochromatic at first and second wavelengths respectively and the reflective layer may reflect at least about 85% of light of the first wavelength and the second wavelength incident thereupon.

The expansion layer may absorb at least about 40% of light of the first wavelength passing and reflected back therethrough or less than about 90% of light at the first wavelength passing and reflected back therethrough. Alternatively, the expansion layer absorbs at least about 50% of light at the first wavelength passing and reflected back therethrough, and transmits at least about 60% of light at the second wavelength passing and reflected back therethrough. In still another embodiment, the expansion layer absorbs from about 50% to about 85% of light at said first wavelength incident upon it and transmits at least about 80% of the light of said second wavelength incident thereupon.

An elongate region defined as a track may be designated for storage of optical data, and portions of the interface along a segment of the track may be displaced to protrude into the substrate to form a binary sequence of height variations in the interface along the track. In one embodiment, the portions are of a height ranging from about 0.1 to about 3.0 times the thickness of the expansion layer or, alternatively, from about 0.5 to about 2.0 times the thickness of said expansion layer. A plurality of the binary sequences may be positioned at regular intervals along said track. The length of the track may be comprised of a series of sublengths each corresponding to one frame on a standard compact disk and each having a leading end and tailing end, and one of the preselected binary sequences is located at the leading end of each sublength. A plurality of the binary sequences may be positioned along the track, the binary sequences representing coded instructions to synchronize the movement of the track with a detection system. A plurality of the binary sequences positioned along the track, the binary sequences representing coded information regarding the distance of the binary sequences along the length of the track. The binary sequences positioned along the track, may represent a coded directory of data to be recorded on the track.

A method for recording data on an optical data storage medium mounted on a rigid substrate may comprise (a) passing a beam of light at a preselected wavelength through the substrate; (b) passing light emerging from the substrate through an expansion layer optically coupled thereto which is partially absorptive of light at the preselected wavelength and which expands with increasing temperature; (c) reflecting light transmitted through the expansion layer off of a deformable reflecting layer and back through the expansion layer, to expand the expansion layer with heat generated by light absorbed thereby combined with light absorbed in step (b), and thereby form a protrusion on the surface thereof facing away from said substrate and a deformation in said reflecting surface conforming to the protrusion; (d) heating by conducting from the expansion layer a retention layer coupled to the reflecting layer, the retention layer having a glass transition temperature substantially above ambient temperature, to raise the temperature of the retention layer above the glass transition temperature to permit the protrusion to deform the retention layer thereto; and (e) cooling the retention layer below the glass transition temperature while so deformed to fix said protrusion in the expansion layer. The retention layer may be optically coupled to the expansion layer and may be between the expansion layer and the reflective layer. The retention layer may be partially absorptive of light of the preselected wavelength incident thereupon. Step (e) may be achieved in part by diffusing energy from the retention layer into a heat absorptive layer which dissipates heat at a rate faster than the expansion layer. The expansion layer may absorb at least about 40% of light at the preselected wavelength incident thereupon. The expansion layer may absorb less than about 90% of light at the preselected wavelength incident thereupon or, alternatively, from about 50% to about 85% of light at the preselected wavelength incident thereupon. The preselected wavelength may be defined as a first preselected wavelength and the retention layer may absorb light at a second preselected wavelength to which the expansion layer is substantially transparent.

It is to be clearly understood that the above description is intended to be illustrative and not restrictive. For example, while the description has been written with regard to the use of lasers as the radiant energy source, other energy sources could be used and would be readily apparent to those of skill in the art. Further, it would be possible to reverse the roles of the erase beam and write beam from that described above, i.e., the write beam could be directed at the medium substantially continuously and the erase beam could be modulated in response to data to be recorded. The scope of the invention should, therefor, be determined not with reference to the above description, but should instead be determined with reference to the appended claims, along with the full scope of equivalents to which they are entitled.

What is claimed is:

1. A storage medium mounted on a rigid substrate in which optical data can be recorded through said substrate by a record light beam and from which data so recorded can be read by a read light beam reflected back through said substrate into a detection system designed to read signals reflected through a layer which is substantially the optical equivalent of said rigid substrate, said storage medium comprising:
    an expansion layer of approximately 0.5 to 1.5 microns in thickness optically coupled to said substrate along an interface therebetween and expandable upon heating to a temperature substantially above ambient temperature to form protrusions in the surface thereof opposite said interface;
    a retention layer of approximately 0.25 to 1.0 micron in thickness optically coupled to said expansion layer and comprised of a material which has a glass transition temperature substantially above ambient temperature and thereby converts from a glassy state at ambient temperature to a rubbery state at a temperature above said glass transition temperature;
    a reflective layer coupled to said retention layer and which reflects at least about 85% of the light from said read light beam passing through said expansion and retention layers back through said expansion and retention layers and said substrate, and is sufficiently elastic to conform substantially to the contour of said retention layer; and
    a protective layer on the side thereof toward which said protrusions extend, said protective layer being of material sufficiently deformable to receive said protrusions; the thicknesses of said expansion layer and said retention layer each being about 1/1000th or less of the thicknesses of said substrate and said protective layer, and said retention layer having a thickness of about 1.0 micron or less.

2. A storage medium mounted on a rigid substrate in which optical data can be recorded through said substrate by a record light beam and from which data so recorded can be read by a read light beam reflected back into a detection system, said storage medium comprising:
    an expansion layer optically coupled to said substrate along an interface therebetween and expandable upon heating to form protrusions on the surface thereof opposite said interface;
    means for retaining protrusions so formed in said expansion layer upon cooling thereof; and
    a reflective layer which reflects at least about 25% of the light striking it and is sufficiently elastic to conform to the contour of said surface, said means for retaining between said expansion layer and said reflective layer.

3. A storage medium in accordance with claim 2 in which said retaining means is a retention layer comprised or material which has a glass transition temperature substantially above ambient temperature and thereby converts from a glassy state at ambient temperature to a rubbery state at a temperature above said glass transition temperature.

4. A storage medium in accordance with claim 2 further comprising a protective layer on the side thereof toward which said protrusions extend, said protective layer being of material sufficiently deformable to receive said protrusions.

5. A storage medium in accordance with claim 2 in which said reflective layer reflects at least about 85% of the light from said read light beam passing through said expansion layer back through said expansion layer and said substrate.

6. A storage medium in accordance with claim 1 or 2 in which said record light beam and said read light beams are each substantially monochromatic at first and second wavelengths, respectively, and said reflective layer reflects at least about 75of light of said first wavelength and said second wavelength incident thereupon.

7. A storage medium in accordance with claim 1 or 2 in which said second light beam and said read light beams are each substantially monochromatic at first and second wavelengths, respectively, and said reflective layer reflects at least about 85% of light of said first wavelength and said second wavelength incident thereupon.

8. A storage medium in accordance with claim 2 in which said expansion layer absorbs at least about 40% of said second beam passing and reflected back therethrough.

9. A storage medium in accordance with claim 2 in which said expansion layer absorbs less than about 90% of light of a second beam passing and reflected back therethrough.

10. A storage medium in accordance with claim 2 in which said expansion layer absorbs at least about 50% of light of said record beam reflected back therethrough, and transmits at least about 60% of a second beam passing and reflected back therethrough.

11. A storage medium in accordance with claim 2 in which said expansion layer absorbs from about 50% to about 85% of said second beam incident upon it and transmits at least about 80% of the light of a second beam incident thereupon.

12. A storage medium in accordance with claim 2 in which said record light beam and said read light beams are each substantially monochromatic at first and second wavelengths, respectively, and said reflective layer reflects at least 85% of light of said second wavelength incident thereupon; and said retaining means is a retention layer which absorbs light at a third wavelength, said retention layer being comprised of a material which has a glass transition temperature substantially above ambient temperature and thereby converts from a glassy state at ambient temperature to a rubbery state at a temperature above said glass transition temperature, and said expansion layer is substantially transparent to light at said third wavelength.

13. A storage medium in accordance with claim 12 in which said retention layer absorbs at least about 40% of light at said third wavelength incident thereupon.

14. A storage medium in accordance with claim 12 in which said retention layer absorbs at least about 50% of light at said third wavelength.

15. A storage medium in accordance with claim 12 in which said retention layer and said protective layer each have a thermal conductivity of at least about $2.5 \times 10^{-4}$ cal/(cm$^2$/° C./(sec/cm)).

16. An erasable optical data storage medium comprising:
  (a) a substantially transparent substrate;
  (b) an expansion layer bonded to said substrate, said expansion layer at least partially absorptive of a write wavelength of light so as to expand in response thereto and from an optically detectable mark;
  (c) a retention layer bonded to said expansion layer to hold said optically detectable mark, said retention layer at least partially absorptive of an erase wavelength of light, said retention layer having a glass transition temperature above ambient temperature and heatable by said erase wavelength of light to a temperature above said glass transition temperature so as to release said mark; and
  (d) a reflective layer bonded to said retention layer, said reflective layer reflective of at least about 25% of light striking it at said write and said erase wavelengths of light, said reflective layer sufficiently elastic to conform to to contour of said detectable mark.

17. Media as recited in claim 16 wherein said expansion layer absorbs at least about 40% of light at said write wavelength passing and reflected therethrough.

18. Media as recited in claim 16 wherein said expansion layer absorbs at least 50% to 85% of light at said write wavelength passing and reflected therethrough.

19. Media as recited in claim 16 wherein said expansion layer transmits at least about 60% of light at said erase wavelength passing and reflected therethrough.

20. Media as recited in claim 16 wherein said expansion layer transmits at least about 80% of light at said erase wavelength passing and reflected therethrough.

21. Media as recited in claim 16 wherein said expansion layer has a coefficient of thermal expansion of greater than about $1 \times 10^{-4}$/° C.

22. Media as recited in claim 16 wherein said expansion layer has a coefficient of thermal expansion of greater than about $7.5 \times 10^{-4}$/° C.

23. Media as recited in claim 16 wherein said retention layer absorbs at least about 40% of light at said erase wavelength passing and reflected therethrough.

24. Media as recited in claim 16 wherein said retention layer absorbs at least about 50% of light at said erase wavelength passing and reflected therethrough.

25. Media as recited in claim 16 wherein said retention layer has a glass transition temperature of from about 50° C. to 200° C.

26. Media as recited in claim 16 wherein said retention layer has a glass transition temperature of from about 75° C. to 125° C.

27. Media as recited in claim 16 wherein said reflective layer reflects at least about 85% of said write and said erase wavelengths of light.

28. Media as recited in claim 16 wherein:
  (a) said expansion layer:
    (i) absorbs at least about 50% to 85% of light at said write wavelength passing and reflected therethrough;
    (ii) transmits at least about 80% of light at said erase wavelength passing and reflected therethrough;
    (iii) has a coefficient of thermal expansion of greater than about $1 \times 10^{-4}$/° C.;
    (iv) as a coefficient of thermal expansion of greater than about $7.5 \times 10^{-4}$/° C.;
  (b) said retention layer:
    (i) absorbs at least about 50% of light at said erase wavelength passing and reflected therethrough;
    (ii) has a glass transition temperature of from about 75° C. to 125° C.;
  (c) said reflective layer reflects at least about 85% of said write and said erase wavelengths of light.

* * * * *